Oct. 29, 1935.  K. HÄHNEL  2,019,409
ABSORPTION REFRIGERATING APPARATUS
Filed July 9, 1934  2 Sheets-Sheet 1

Inventor
Kurt Hähnel
By Robert Robb
attorneys

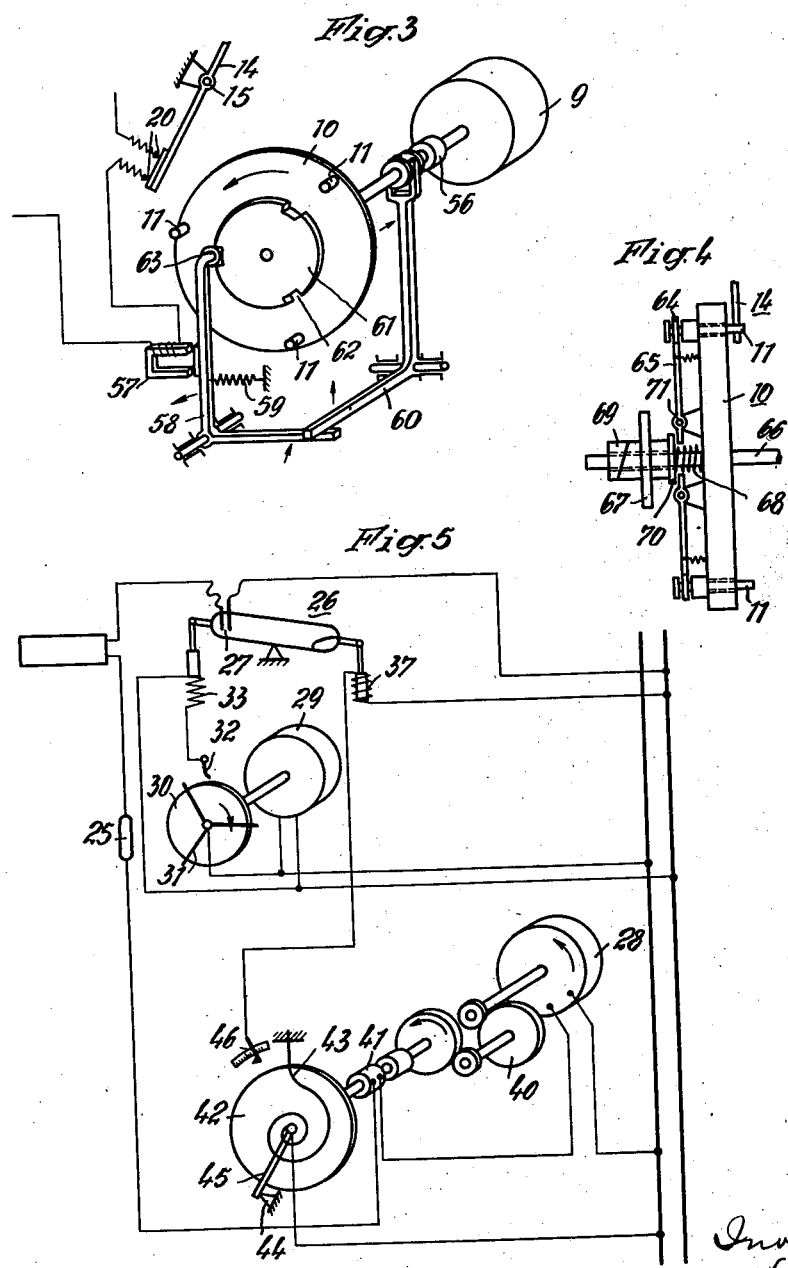

Patented Oct. 29, 1935

2,019,409

UNITED STATES PATENT OFFICE 2,019,409

ABSORPTION REFRIGERATING APPARATUS

Kurt Hähnel, Berlin-Siemensstadt, Germany, assignor to Siemens-Schuckertwerke Aktiengesellschaft, Berlin-Siemensstadt, Germany, a corporation of Germany Application July 9, 1934, Serial No. 734,388
In Germany July 14, 1933

12 Claims. (Cl. 62—5)

My invention relates to improvements in absorption refrigerating apparatus of the intermittent type and more particularly to improvements in heat control devices therefor.

Systems for regulating the heat required for the operation of absorption refrigerating apparatus of the intermittent type are well known. One of the simplest ways of attaining this aim consists in employing a time-control switch inserted in the heating circuit of the generator-absorber. This clock switch is so set as to energize the heating device for a predetermined period and to deenergize the same for a predetermined period. When employing electrically heated absorption refrigerating apparatus in connection with such heat control devices disadvantages are presented in that the energy input to the heating element depends to a great extent upon the fluctuations of voltage resulting in the supply circuit.

In other heat control systems hitherto known thermostats are employed operating in accordance with the temperature prevailing in the absorption refrigerating apparatus for energizing and deenergizing the heating element. The thermostats, for instance operate in accordance with the temperature prevailing in the generator-absorber and evaporator. The various heat control systems of the above-indicated character hitherto employed may be readily adapted in operation to the outer operating conditions (temperature of the refrigerant, required amount of refrigeration and the like). By the use of such thermostats it is in most cases necessary to effect the switching operation at great differences of temperature. For instance, it is required that the thermostat operating in accordance with the temperature prevailing in the generator-absorber be deenergized at 130° and energized at 40° C. Thermostats of this type encounter great difficulties in manufacturing the same and are not reliable in operation.

The object of the present invention is to provide a heat control device for absorption refrigerating apparatus of the intermittent type, whereby the difficulties encountered in the heat-control systems hitherto known are removed. To this end a counting mechanism (gas or kilowatt hour meter) is inserted in the heating circuit which causes the heating agent to be cut off after a predetermined amount of the heating power has been supplied. In order to obtain a simple and efficient system the energy input of the heating element is adjusted to the optimum value of the refrigerating apparatus under consideration.

The control of the heat supply is effected according to the invention by adjusting the counter mechanism in such a manner as to supply the generator with a smaller or greater amount of heat energy without thereby impairing the efficiency of the system, whereas in the heating systems hitherto known operating with a given number of heat regulating ranges the efficiency of these systems is impaired when passing from the normal heat regulating range to the ranges corresponding to a smaller supply of heat energy.

The counting mechanism adapted to determine the quantity of heating energy may be employed in various ways. For instance, the heating periods may be initiated by a hand-operated switch. To provide a completely automatic system a clockwork is provided for the energization of the heating system, the clock switch being equipped with a mechanical or electrical winding device.

The energization of the heating element may be also controlled by thermostats which regulate the temperature prevailing in the evaporator and generator-absorber. In this case the heating element is energized upon an increase in temperature in the evaporator above a predetermined value and upon a decrease of the temperature in the generator-absorber below a predetermined value, while the counting mechanism provides for the proper heat input.

After the energization of the heating element the counting mechanism determines the duration of the heating period. It switches off the heating agent directly or indirectly after a predetermined adjusted amount of energy has been consumed. The clockwork reenergizes the heating element after a predetermined period. The reenergization of the heating system is besides preferably controlled by a thermostat which is arranged in the cooling chamber itself or in contact with the cold producing parts of the absorption refrigerating apparatus. This thermostat interrupts the circuit upon a decrease of the temperature below a predetermined value and prevents the energization of the heating element of the generator till the temperature increases above a predetermined value. In this manner a device is obtained which may be easily adapted to the fluctuating operating conditions.

In the accompanying drawings some embodiments of my invention are illustrated in diagrammatical form.

Fig. 3 shows details of switching mechanisms according to my invention.

Fig. 4 shows a modified form of my invention and

Fig. 5 shows an embodiment of an electrically operated tilting switch according to my invention for energizing and deenergizing the heating element of the generator.

Figure 1:
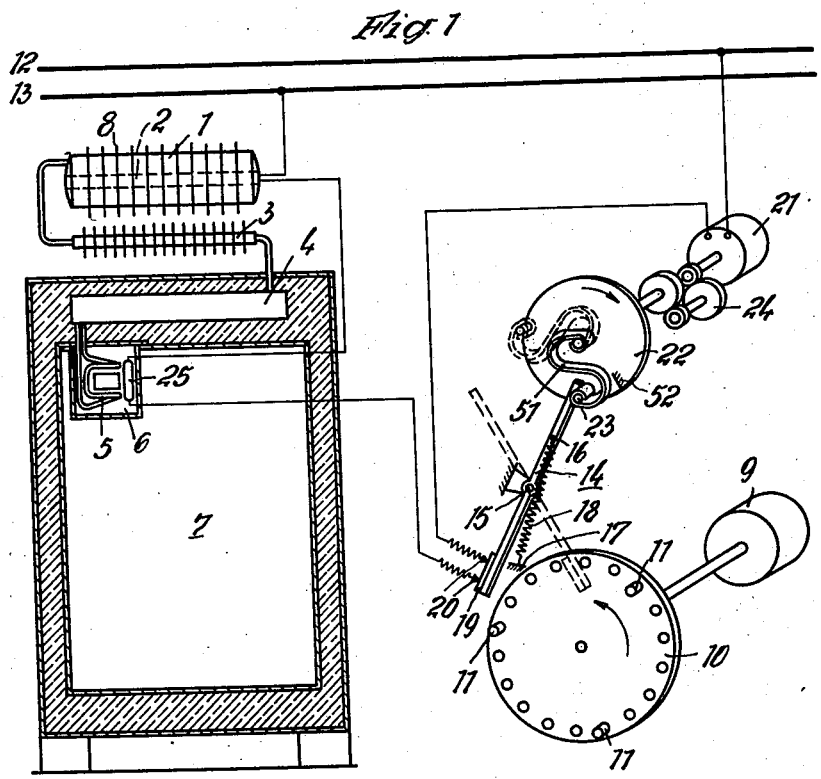
Fig. 1 shows an embodiment of my invention as applied to a domestic refrigerator which is equipped with an air-cooled absorption refrigerating apparatus of the intermittent type.

Referring to Fig. 1, 1 denotes the generator-absorber charged with solid chemical absorbents, for instance calcium-chloride. The generator-absorber is heated by an electric heating element 2 disposed within the same. During the heating period the refrigerant (for instance ammonia) is driven off from the generator-absorber 1 and passes into an air-cooled condenser 3 whence it passes into an intermediate container 4 arranged in the insulation of the refrigerator. An evaporator coil 5 disposed in a cold accumulator 6 is connected to the container 4. The accumulator projects into the cooling chamber 7 as shown in Fig. 1. During the absorption period the liquid refrigerant contained in the evaporator is again evaporated and flows back into the generator-absorber where it is reabsorbed by the solid absorbents. To effect a good dissipation of the heat of absorption cooling ribs 8 are arranged on the outer wall of the generator-absorber.

In order to energize the heating element a switching disc 10 driven by a clockwork 9 is provided. The disc 10 carries three switching pins 11 distributed as disclosed in Fig. 1 over the periphery of the disc 10.

To insert the switching pins 11 in the disc 10, the latter is preferably provided with a relatively large number of holes so that the time of the energizing impulses and the spaced interval between two energizing impulses may be varied at will.

The switching disc 10 makes in the present case a complete revolution within 24 hours, so that three impulses are transmitted in the course of 24 hours by the three switching pins. The heating energy is supplied by a supply circuit 12, 13. A switch 14 serves to energize and deenergize the heating element 2, the switch being rotatably mounted as shown at 15. A spring 18 is attached to the upper part of the switch and firmly fixed as shown at 17. The lever switch 14 is provided with a movable contact 19 which in the position shown in the drawings engages the elastically designed stationary counter contacts 20, thus closing the heating circuit.

By closing the heating circuit a kilowatt hour meter 21 is operated which drives a second switching disc 22 in clockwise direction. The disc 22 carries a switching pin 23 which cooperates with the upper free end of the switch 14. The duration of the heating is preferably determined by a complete rotation of the switching disc 22. There are also cases in which ½, ¼ or ⅛ of a revolution are desirable. After the switching disc 22 has made a complete revolution, the switching pin 23 brings the switch 14 into the switching position shown in dotted lines, thus interrupting the heating circuit. The spring 18 serves to render possible an abrupt interruption of the heating circuit.

Between the counting mechanism 21 and the switching disc 22 a transmission gear 24 is provided by means of which the duration of the heating period may be adjusted. Since in the present case it is intended to operate with the optimum energy input, the desired amount of energy input may be easily determined by changing the transmission gear 24 between the disc 22 and the meter 21.

As the meter 21 remains at rest after the heating element has been deenergized care should be taken to eliminate the blocking of the switch 14 by the switching pin 23 upon the reenergization of the heating element. The switching pin 23 is, therefore, not rigidly fixed to the disc 22 but is connected with the disc 22 by means of a spring 51. Further a stop 52 is arranged on the disc 22 and serves to prevent the movement of the switching pin 23 to the right but does not prevent, however, the lever 14 from moving. Upon the rotation of the disc 22 the switching pin 23 engages at first the upper end of the lever 14. The disc 22 rotates under the tension of the spring 51 until the stop 52 takes along the switching pin 23. The latter rotates the switching lever 14 to such an extent that it snaps over in the other switch position when surpassing the unstable position of equilibrium. At this moment the switching pin 23 is brought away from the stop 52 under the action of the spring 51 into the position shown in dotted lines, so that it does not prevent the movement of the switching lever 14 when springing backwards.

Figure 2:
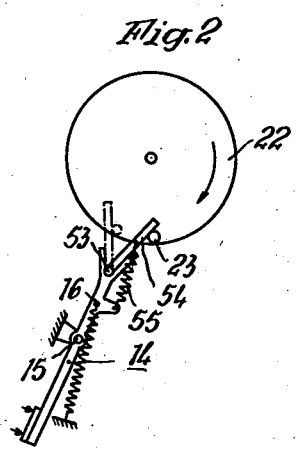
Fig. 2 shows a detail of a switching mechanism for energizing and deenergizing the heating element.

Another modification of the switch shown in Fig. 1 with which the blocking of the switch 14 effected by the switching pin 23 is eliminated is shown in Fig. 2. In this embodiment the switching pin 23 is rigidly connected to the disc 22. The upper end of the switching lever 14 is provided in this case with a lever 54 rotatably mounted as shown at 53, which is brought into the position shown in the drawings by a spring 55. If the switching pin 23 owing to the rotation of the disc 22 engages the lever 54 the latter is brought under the tension of the spring 55 into the position shown in dotted lines by the switching pin 23. The lever 54 is rotatably mounted in a fork-shaped upper end of the switch 14, so as not to pass beyond the position shown in dotted lines. Upon further rotation of the disc 22 the switching pin 23 brings the switch 14 beyond the unstable position, so that it tips over into the other switch position. Consequently, the lever 54 is free to move and is brought under the action of the spring 55 into such a position that it may be caused to pass the switching pin 23 at rest without touching it upon the snapping back of the switch 14.

To control the temperature in the cooling chamber a thermostat 25 is provided which is arranged in the cold storage tank 6. The thermostat 25 locks the heating circuit so long as the temperature in the cooling chamber lies below a predetermined value. As soon as the thermostat causes the energization of the heating element the next following heating period may be initiated, if the time adjusted on the disc 10 between the energization and deenergization of the heating element has at least elapsed. If the switching disc 10 has already closed the contacts 19 and 20 the energization of the heating element is directly controlled by the thermostat.

In practice it is possible that the heating element controlled by the thermostat 25 in the case of a three-period per day absorption refrigerating apparatus is not energized after eight hours but after twelve hours. In this case the kilowatt hour meter cuts off the current after a given period, for instance after one and a half hours. The next switching pin of the disc 10 would then, however, initiate a new heating period already after two and a half hours. This would be, however, too soon, since the reserve of refrigerant which has been expelled shortly before would not be consumed. For this reason it is advisable to eliminate the action of the next following switching pin of the disc 10 in case the heating takes place too late. This may be attained in a simple manner by causing a brake controlled by the thermostat 25 to act upon the shaft between the clockwork 9 and the switching disc 10. The brake stops the clockwork 9 and the switching disc 10 as long as the thermostat interrupts the circuit.

An arrangement which operates without stopping the clockwork 9 is shown in Fig. 3. The switching disc 10 is released from the clockwork 9 upon the switching in of the switch 14 by one of the switching pins 11 or shortly afterwards by a coupling 56. An electromagnet 57 which is series-connected with the contacts 20 bridged by the switch 14 serves to actuate the coupling 56. If the electromagnet 57 is energized it moves the lever 58 in opposite direction to the action of a spring 59 so that the coupling 56 is switched in by means of the bell crank lever 60. A switching disc 61, which is provided with notches 62, is firmly arranged on the disc 10 so that the upper end 63 of the lever 58 engages as shown in Fig. 3 one of the notches. The disc 10, consequently, rotates only when the switch 14 has been thrown into the position shown.

Consequently, the disc rotates from the beginning of the heating period in the present case, for instance, for eight hours before the next switching pin may effect a switching operation. If it is desired to operate the system with cheap night current a locking switch which is also actuated by the clockwork 9 should be inserted in the circuit.

The operation of the lever 58 may be also effected directly by a thermostat which upon changes in temperature adjusts a bellows. Such an arrangement is particularly in use in systems operating with gas heating.

The construction shown in Fig. 4 operates according to the tariffs fixed by public utilities.

Fig. 4 shows a side elevation of a switching disc 10 which is actuated by a clockwork (not shown) through the shaft 66 firmly secured to the disc 10. This switching disc 10 may, for instance, be employed for energizing the heating element of the generator in a control device as shown in Fig. 1. For the sake of simplicity only those parts cooperating directly with the switching disc 10 are illustrated in Fig. 4, i. e., only the lower end of the pivotally mounted switch 14 of Fig. 1 and the switching disc 10 of the device serving to energize and deenergize the heating element. The switching pins 11 are movably arranged in the disc 10 so as to prevent them under certain conditions from cooperating with the lower end of the switch 14. To this end, a lever 65 provided with a fork 64 engaging the pins 11 is so pivotally mounted as indicated at 71 as to move the pins in the outward direction, thus bringing the latter out of contact with the lower end of the switching lever 14. While the switching disc 10 is firmly connected to the axis 71 a slidably mounted switching disc 67 is mounted on the same shaft, the disc 67 being fixed to the switching disc 10 as shown in Fig. 1 by means of the spring 68. In this embodiment the switching pins 11 are brought into the switch position shown at the desired time. The switching disc 67 is connected in a similar manner as shown in Fig. 3, for instance, by switching in the heating current with the aid of a magnet with the disc 10 by means of the coupling 69. Besides, the coupling 69 during this operation also moves the switching disc 67 to the right so that the dish-shaped portion 70 presses against the free ends of the lever 65 and raises, consequently, the three switching pins 11, thus preventing them from switching in the switch 14 until the eight hours for which the switching disc 67 has been set have elapsed, until the lever 58 shown in Fig. 3 comes to rest and until the coupling disengages and then again sets free the switching pins in the switching position. Consequently, the next switching pin is prepared for the switching in.

Fig. 5 shows an embodiment of my invention in which the energizing and deenergizing impulses are transmitted electromagnetically through a tilting switch. The same numerals of Fig. 1 denote corresponding parts of Fig. 5. A tilting switch 26 serves to switch in and out the heating current. In the switch position shown the heating circuit is interrupted. 29 is a clockwork connected to the supply circuit and drives a switching disc 30 so that it makes a complete rotation within 24 hours. The switching disc 30 consists of insulating material and has three contacts 31 spaced at equal intervals on the periphery, the contacts being directly connected to the positive pole of the supply circuit. A stationary counter contact 32 cooperates with the contacts 31. As soon as one of the contacts 31 engages the contact 32 the coil of the magnet 33 of the tilting switch is energized so that the latter is tilted into the other switch position, thus closing the heating circuit at its contact 27. By the closure of the contacts 27 the kilowatt hour meter 28 is also simultaneously set which in turn rotates a switching disc 42. The meter 28 is connected with the switching disc 42 through a transmission gear 40 by means of an electromagnetic coupling 41. During the absorption period the disc 42 is kept in the position of rest as shown in the drawings so that the movable contact 45 engages the stop 44. Upon the energization of the heating element the kilowatt hour meter 28 comes into engagement with the disc 42. The latter moves towards the stationary contact 46 opposite to the action of the spring 43. A counter contact 46 is adjustably arranged so that it may be set for the desired amount of energy. When the contact 45 comes into engagement with the contact 46 the heating element is deenergized owing to the energization of the circuit-breaking magnet 37 and the coupling 41 is simultaneously released. Consequently, the disc 42 rotates under the action of the spring 43 back to the position of rest shown. To remove the difficulties which may be presented by a delayed energization of the heating element with the aid of the cooling chamber thermostat, it is advisable to also arrange in the embodiment shown in Fig. 5 the auxiliary means employed in Fig. 3 or Fig. 4.

It should be understood that I do not limit my invention to the specific arrangements or constructions shown. Many changes in arrangement in construction, particularly when using a gaseous heating agent instead of electric heat, will be obvious to those skilled in the art to which this invention belongs.

I claim as my invention:

1. In a system for heating the generator of an absorption refrigerating apparatus of the intermittent type, an energy source for said generator, a line connecting said source with said generator, means inserted in said line for cutting in and out the supply of heating energy to said generator and comprising a clockwork actuated switching mechanism to initiate the supply of heating energy to said generator and a counting mechanism for cutting out the heat supply to said generator after a predetermined amount of heating energy has been consumed in said generator.

2. In a system for heating the generator of an absorption refrigerating apparatus of the intermittent type, an energy source for said generator, a line connecting said source with said generator, means inserted in said line for cutting in and out the supply of heating energy to said generator and comprising a clockwork actuated switching mechanism to initiate the supply of heating energy to said generator and a counting mechanism for cutting out the heat supply to said generator after a predetermined amount of heating energy has been consumed in said generator, and a thermostat inserted in said line to permit a supply of heating energy to said generator at a predetermined temperature.

3. In a system for heating the generator of an absorption refrigerating apparatus of the intermittent type, a cooling chamber, an energy source for said generator, a line connecting said source with said generator, means inserted in said line for cutting in and out the supply of heating energy to said generator and comprising a switching mechanism to initiate the supply of heating energy to said generator and a counting mechanism for cutting out the heat supply to said generator after a predetermined amount of heating energy has been consumed in said generator, and a thermostat in said cooling chamber and inserted in said line being so set as to interrupt the supply of heating energy to said generator upon a decrease of the temperature in said cooling chamber below a predetermined value.

4. In a system for heating a generator of an absorption refrigerating apparatus of the intermittent type, the combination with an energy source for said generator and a line connecting said source with said generator, of means for cutting in and out the supply of the heating energy to said generator and comprising a switching mechanism to initiate the supply of heating energy to said generator and a heating energy counting mechanism actuated switching disc having a pin arranged thereon, said switching mechanism cooperating with said pin so as to interrupt the supply of heating energy after the disc has rotated a given angle.

5. In a system for heating a generator of an absorption refrigerating apparatus of the intermittent type, the combination with an energy source for said generator and a line connecting said source with said generator, of means for cutting in and out the supply of the heating energy to said generator and comprising a switching mechanism to initiate the supply of heating energy to said generator and a counting mechanism actuated switching disc having a pin arranged thereon, and a transmission gear so disposed between said counting mechanism and said switching disc as to interrupt the supply of heating energy after the disc has been caused through said gear to rotate a given angle.

6. In a system for heating the generator of an absorption refrigerating apparatus of the intermittent type, an energy source for said generator, a line connecting said source with said generator, means inserted in said line for cutting in and out the supply of heating energy to said generator and comprising a switching mechanism to initiate the supply of heating energy to said generator and a counting mechanism for cutting out the heat supply to said generator after a predetermined amount of heating energy has been consumed in said generator, and heat energy adjusting means including a movable contact and an adjustable counter contact, said movable contact being rotated from its position of rest by said counting mechanism to engage said counter contact.

7. In a system for heating the generator of an absorption refrigerating apparatus of the intermittent type, an energy source for said generator, a line connecting said source with said generator, means inserted in said line for cutting in and out the supply of heating energy to said generator, and comprising a tilting switch to initiate the supply of heating energy to said generator, a heating energy counting mechanism cooperating with said tilting switch so as to cut out the heat supply to said generator after a predetermined amount of heating energy has been consumed in said generator.

8. In a system for heating a generator of an absorption refrigerating apparatus of the intermittent type, the combination with an energy source for said generator and a line connecting said source with said generator, of means for cutting in and out the supply of the heating energy to said generator and comprising a switching mechanism to initiate the supply of heating energy to said generator and a counting mechanism actuated switching disc and a coupling adapted to engage said counting mechanism with said switching disc upon the operation of said counting mechanism.

9. In a system for heating the generator of an absorption refrigerating apparatus of the intermittent type, an energy source for said generator, a line connecting said source with said generator, means inserted in said line for cutting in and out the supply of heating energy to said generator and comprising a switching mechanism for initiating the supply of heating energy to said generator and a counting mechanism for cutting out the heat supply to said generator after a predetermined amount of heating energy has been consumed in said generator and heat energy adjusting means combined with said counting mechanism.

10. In a system for heating the generator of an absorption refrigerating apparatus of the intermittent type, an energy source for said generator, a line connecting said source with said generator, means inserted in said line comprising a tilting switch for initiating the supply of heating energy to said generator, a counting mechanism provided with a switching disc cooperating with said tilting switch so as to cut out the heat supply to said generator after a predetermined amount of heating energy has been consumed in said generator and a clockwork actuated switching disc adapted to switch in said tilting switch.

11. In a system for heating the generator of an absorption refrigerating apparatus of the intermittent type, an energy source for said generator, a line connecting said source with said generator, means inserted in said line, and comprising a tilting switch for initiating the supply of heating energy to said generator, a counting mechanism provided with a switching disc cooperating with said tilting switch so as to cut out the heat supply to said generator after a predetermined amount of heating energy has been consumed in said generator and a clockwork actuated switching disc adapted to switch in said tilting switch, the first named switching disc having a spring so arranged as to rotate said switching disc in the direction opposite to the action of said spring to the off-position of the tilting switch.

12. In a system for heating the generator of an absorption refrigerating apparatus of the intermittent type, an energy source for said generator, a line connecting said source with said generator, means inserted in said line comprising a tilting switch for initiating the supply of heating energy to said generator, a counting mechanism provided with a switching disc cooperating with said tilting switch so as to cut out the heat supply to said generator after a predetermined amount of heating energy has been consumed in said generator and a clockwork actuated switching disc adapted to switch in said tilting switch, said first named switching disc being provided with a movable stop adapted to render ineffective the action of said counting mechanism actuated switching disc on said switching mechanism at the beginning of the heating period.

KURT HÄHNEL.